(12) United States Patent
Or et al.

(10) Patent No.: US 9,317,871 B2
(45) Date of Patent: Apr. 19, 2016

(54) MOBILE CLASSIFIEDS SEARCH

(71) Applicant: vMobo, Inc., Bangalore (IN)

(72) Inventors: Yan Or, San Francisco, CA (US); Anand Kumar Sankaran, Fremont, CA (US); Madhu Gopinathan, Bangalore (IN); Vinu Sundaresan, Fremont, CA (US)

(73) Assignee: vMobo, Inc., Bangalore (IN)

( * ) Notice: Subject to any disclaimer, the term of this patent is extended or adjusted under 35 U.S.C. 154(b) by 233 days.

(21) Appl. No.: 13/903,897

(22) Filed: May 28, 2013

(65) Prior Publication Data

US 2014/0229474 A1 Aug. 14, 2014

Related U.S. Application Data

(63) Continuation-in-part of application No. 13/765,634, filed on Feb. 12, 2013.

(51) Int. Cl.
*G06F 7/00* (2006.01)
*G06Q 30/02* (2012.01)
*G06F 17/30* (2006.01)

(52) U.S. Cl.
CPC ...... *G06Q 30/0256* (2013.01); *G06F 17/30648* (2013.01)

(58) Field of Classification Search
CPC .................................................. G06F 17/30648
See application file for complete search history.

(56) References Cited

U.S. PATENT DOCUMENTS

2012/0010955 A1* 1/2012 Ramer et al. ............... 705/14.46
2012/0084291 A1* 4/2012 Chung et al. ................. 707/741

* cited by examiner

*Primary Examiner* — Ajith Jacob

(57) ABSTRACT

A classified ads server receives a search query from a mobile device operated by a user. The search query is parsed and a plurality of tokens is extracted from the search query. A query classification is determined based on the query, using a domain index, and query response candidates are selected from a content index based on the search query tokens and the query classification. A relevance score is generated for each of the query response candidates, and a classified ad is selected based on the relevance scores. The classified ad is sent to the user device.

20 Claims, 2 Drawing Sheets

MOBILE CLASSIFIEDS SEARCH

CROSS-REFERENCE TO RELATED APPLICATION

This application is a continuation-in-part of co-pending U.S. application Ser. No. 13/765,634, "Location-Based Mobile Search," filed Feb. 12, 2013, by Yan Or, Anand Kumar Sankaran, Madhu Gopinathan, and Vinu Sundaresan, which is incorporated by reference in its entirety.

BACKGROUND

This invention relates generally to mobile search and, in particular, to mobile classified ads search.

As the number of cell phones and other mobile devices has increased in the world, the number of search queries originating from mobile users has also similarly increased. Many users utilize mobile devices to search for information using popular search services such as GOOGLE™ and BING™. These services provide search results but often have drawbacks. First, such services may require mobile devices that support an Internet connection, while many mobile users are still using cell phones that only support voice and text messaging. Second, such services may require a user's device to run specific applications, or at the very least a web browser, while many users are still operating mobile hardware that does not support third party applications or web browsers. Finally, many search services are oriented to providing search results for touch screen devices or devices with mouse controls, and as such often provide verbose results, such as multiple items in their responses, assuming that the user will be able to navigate through the responses and select from amongst them. In reality, many mobile users operate devices that cannot display large amounts of data, and which lack input means, such as touch screens or mouse controls, to easily select and navigate data.

Thus there is a need for a search service that can provide accurate search results that are relevant to a user's search query, without requiring extensive user interaction or sophisticated input controls in the user's device.

SUMMARY

Access to classified ads via mobile devices is provided. In one aspect, a search query is received by a classified ads server, from a mobile device operated by a user. The search query comprises one or more query tokens. The tokens from the search query are normalized. A query classification is determined for the query based on the query tokens and a domain index. The domain index contains information about the classifications, features, and attributes for a particular domain. A plurality of query response candidates are selected from a content index based on the query classification and the tokens obtained from the search query. The query response candidates may be selected from the content index by determining the number of tokens each document from the content index has in common with the search query. A relevance score is generated for each of the plurality of query response candidates and a query response is selected from the candidates based on their relevance scores. The selected query response is sent to the user's mobile device.

Other aspects include systems, devices, methods, and applications for the approaches described above and their variants.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

System Overview

Figure 1:
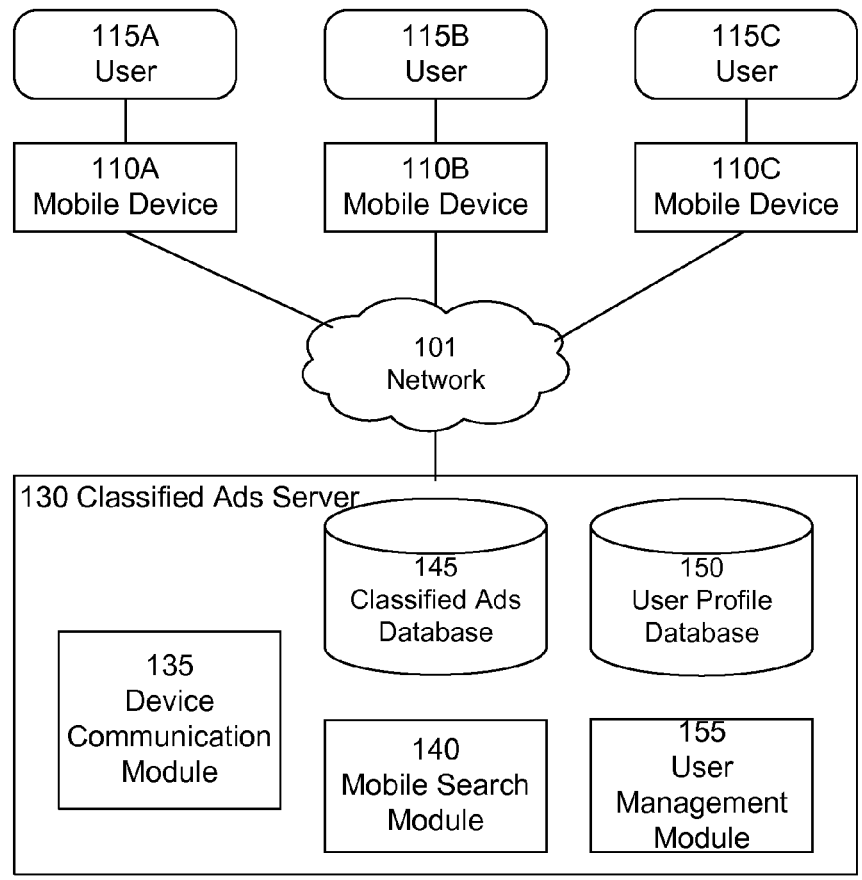
FIG. 1 is a block diagram of a system environment including an embodiment of a classified ads server.

Figure (FIG. 1) illustrates an example classified ads server 130 operating in a networked environment. Here the classified ads server 130 is connected via a network 101 with three mobile devices 110, but many more mobile devices 110 may connect to the classified ads server 130 in practice.

The mobile devices 110 may be any device with the ability to communicate with the classified ads server 130, such as smart phones, tablets, laptops, personal computers, cell phones, etc. A user 115 operating a mobile device 110 can send a search query in the form of a query string to the classified ads server 130. The query may be communicated to the classified ads server 130 through any communication means, including through Short Message Service (SMS), through TCP/IP, etc. A mobile device 110 can also receive a query response from the classified ads server 130 through similar communications means, and can display the query response to the user through a display screen or other output means. The query response will contain information that is relevant to the user's search query. In some embodiments, the query response contains information regarding classified advertisements that are posted in the classified ads server 130.

The network 101 provides a communication infrastructure between the mobile devices 110 and the classified ads server 130. The network 101 may include cellular networks, the Internet, a Local Area Network (LAN), a Metropolitan Area Network (MAN), a Wide Area Network (WAN), a mobile wired or wireless network, a private network, a virtual private network, etc.

The classified ads server 130 receives queries from the mobile devices 110 and generates query responses that are sent back to those devices. A query response contains information that is relevant to a user's search query that is determined by the classified ads server 130. In one embodiment, the information contained in the query response includes one or more classified advertisements relevant to the user's search query. The classified ads server 130 includes a device communication module 135, a mobile search module 140, a user management module 155, a user profile database 150, and a classified ads database 145.

The device communication module 135 handles communication between the classified ads server 130 and the mobile devices 110. The device communication module 135 enables the classified ads server 130 to perform common communications-related operations on messages that are sent and received, such as encryption/decryption, compression/decompression, authentication, etc. Queries sent from mobile devices 110 are received by the device communication module 135 and sent to the mobile search module 140, and query results produced by the mobile search module 140 are sent by the device communication module 135 to the mobile devices 110.

The device communication module 135 may also receive requests to post new classified ads. The request may be received via a plurality of communication media, such as SMS, email, through a website, an application installed in a computing device, and the like. New classified ads may be stored in the classified ads database 145. In some embodiments, additional information such as posting date, expiration date, account information of posting user, and the like may be saved in conjunction with the classified ad in the classified ads database 145. Additionally, the classified ads server 130 may index the classified ads. The process of indexing classified ads is described in more detail in U.S. patent application Ser. No. 13/765,634, "Location-Based Mobile Search," filed Feb. 12, 2013, by Yan Or, Anand Kumar Sankaran, Madhu Gopinathan, and Vinu Sundaresan, which is incorporated by reference in its entirety.

The device communication module 135 may also receive a request to manage a classified ad(s). For example, a user that posted a classified ad may request to modify the ad or delete the ad. In one embodiment, the classified ads server 130 may determine whether the user has permission to manage the classified ads. In one embodiment users only have permission to manage classified ads they post. In other embodiments, a user posting a classified ad may specify one or more other users that have permission to manage the classified ad. If the user is determined to have permission to manage the ad, the requested action (e.g., modify, delete, etc) may be performed.

The user management module 155 enables users operating the mobile devices 110 to establish a user account with the classified ads server 130. The user management module 155 may receive information about users operating the mobile devices 110, from the mobile devices 110 or from other sources such as directories, retailers, credit agencies, banks, etc. Some user information may be provided by users when they establish a new account with the classified ads server 130, and other information may be collected passively by the user management module 155 over the course of time, as users send search queries to the server (i.e. perform searches).

The user profile database 150 stores the information about users that has been received or collected by the user management module 155. The user profile database 150 may contain information about a user such as age, sex, religion/caste, culture, marital status, horoscope, profession, search history, etc.

The mobile search module 140 indexes documents (such as classifieds) and maintains a content index. When queries are received from mobile devices 110, the mobile search module 140 identifies query results that are references to indexed documents that are relevant to the query strings. The query results may be sent back to the mobile devices 110 via the device communication module 135.

Search Module

Figure 2:
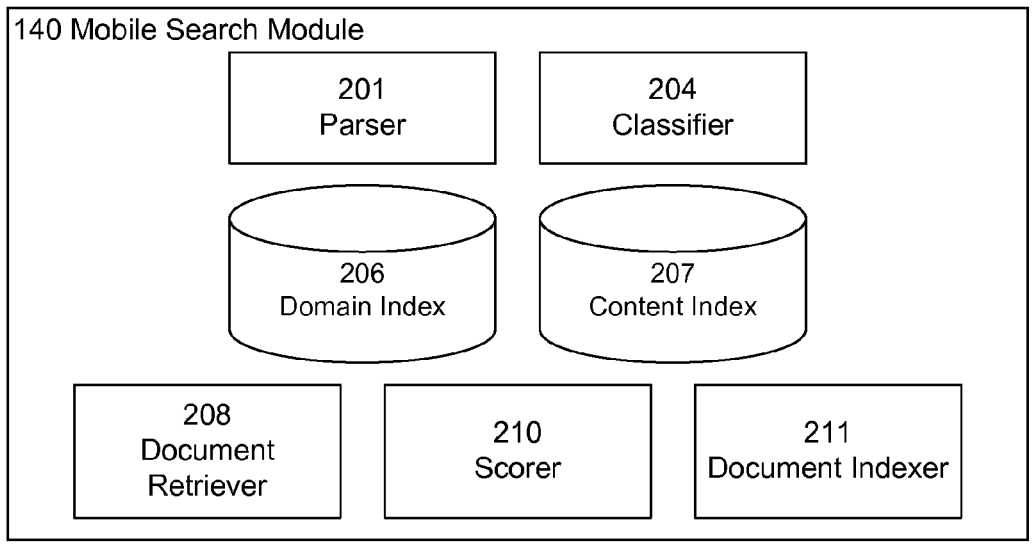
FIG. 2 is a block diagram showing a detailed view of one embodiment of a search module.

FIG. 2 illustrates a detailed view of the components of the mobile search module 140, according to one embodiment. In the illustrated embodiment, the mobile search module 140 comprises a parser 201 a classifier 204, and a scorer 210, as well as domain index 206 and content index 207. The mobile search module 140 also includes document retriever 208 and document indexer 211.

The parser 201 processes queries (query strings) received from the mobile devices 110 and generates a sequence of tokens. The query tokens are words or sequences of words that correspond to concepts that may be relevant to the generation of query responses. For example, the words "New" and "York" are tokens, and the sequence "New York" is also a token. Generating tokens from strings can be done using different techniques. These techniques are well known in the art. For example the system may use a dictionary-based approach for tokenizing the query. In the dictionary-based approach the words in the query are matched against words (tokens) in a premade dictionary to determine the words that are valid tokens. The parser 201 may also be used to generate tokens from content documents that are indexed by the mobile search module 140. The indexing of content documents is described in more detail herein.

The classifier 204 takes the tokens outputted by the parser 201 and using the domain index 206 can determine a classification for a query or document based on those tokens. For example, if a query string is "want men hindu 21-24," the classifier 204 can determine that the query is related to the classifications "seeking men". Similarly the classifier 204 may classify documents that are indexed in the content index 207 by processing the tokens that have been produced from the documents by the parser 201.

The classifier 204 uses a domain index 206 to determine the classification (or topic) to which a query string or document relates to in a particular domain. A domain index 206 is useful in determining the classification of a query for a single domain. Separate domains will have different domain indexes 206. For instance, there may be a single domain index 206 to handle queries related to matrimonial classified advertisements, while there may be a separate domain index 206 to handle queries related to automobile classified advertisements. Other classifications may include, for example, classified want ads for buying and/or selling physical objects, classified want ads for real estate rentals, classified want ads for persons seeking other persons, newspaper classified ads, jobs classified ads, and the like.

A domain index 206 comprises a list of classifications for a domain, as well as standard and domain-specific features for each of those classifications. The classifications are categories of contents that are relevant for a domain. For example, if the domain is automobile classifieds, the classifications may be car sales classifieds, truck sales classifieds, new car classifieds, etc. The features are characteristics of queries and documents in the domain. The features may be standard, as in not domain-specific, or domain-specific. For example, if the domain is matrimonial classifieds, the features may be characteristics of the person represented in a marriage classified ad, such as age range, sex, religious background, etc. A domain index 206 also contains a list of attributes for each feature that are possible values for that feature. For example, for the age range feature, the attributes may be ages 18-25, ages 26-30, ages 31-35, etc.

The classifier 204 compares tokens in the query string to attributes and features in the domain index 206, to determine a classification for the query. For example, if the query contains tokens such as "Male", "18-25", "Christian", the classifier 204 may use this information to classify the query as a matrimonial classified in the classification "Looking for Men."

A content index 207 is a database containing indexed documents for a domain, which is used to determine query responses. A content index 207 comprises a list of documents, where each document is associated with attributes, document contents, and one or more classifications. For example, for the domain "automobile classified advertisements", the content index 207 may contain a list of classified advertisements with associated data. In this content index 207, one classified ad may have, for instance, an associated classification "car sales classified", with the attributes "Honda", "1997", to indicate that the car advertised for sale in the classified is a Honda made in 1997. The document indexer 211 generates a content index 207 for a domain by processing raw data (such as the text of classified advertisements) and creating a domain specific database for the content in that raw data.

The scorer 210 generates relevance scores for documents, which influences how documents are determined for query responses. The relevance scores are a measure of the predicted relevance of a document to the query. The process for generating a relevance score may depend on the values of classifications, features, and attributes that have already been determined for a query or document.

The scorer 210 is also used by the document retriever 208 to determine a document that can be sent as a response to a query. The document retriever 208 determines a query response document for a query by using the scorer 210 to determine a relevance score for each of a plurality of query response candidates (candidate documents), and selecting the candidate with the highest relevance score. The relevance score for a document that is a candidate query response can be determined based on factors such as distance between the location associated with the candidate document and a target location associated with the query, user profile information for the user that issued the query, the query's classification, attributes determined for the query, etc. A more detailed description of the process for selecting a query response document is given in conjunction with the description for FIG. 3.

Query Response Generation Process

Figure 3:
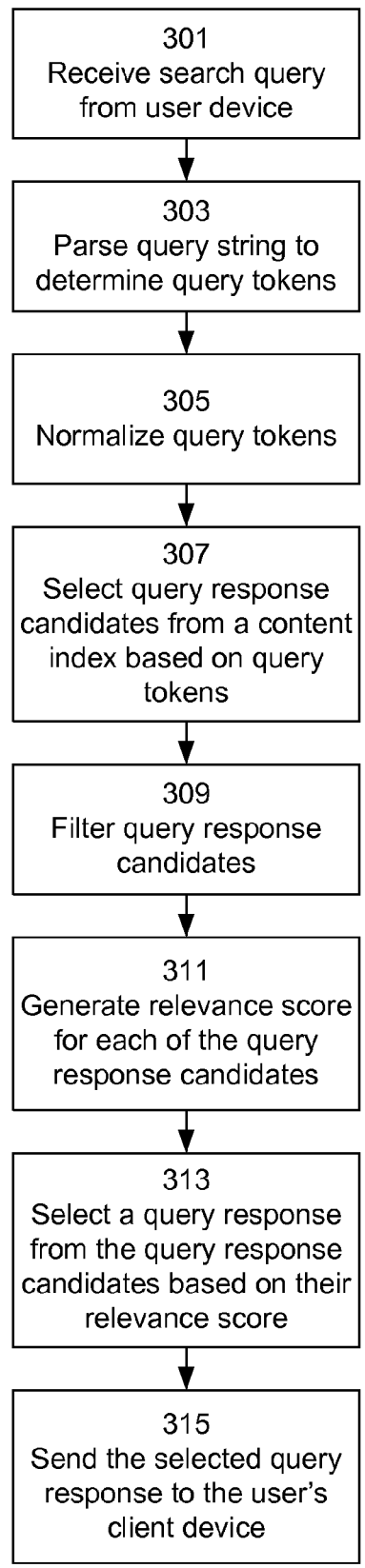
FIG. 3 is a flow chart of a process for responding to a search query for classified ads, according to one embodiment.

FIG. 3 illustrates a high level flowchart of a process used by the classified ads server 130 for responding to a search query for classified ads. In this process a query is received 301 by the mobile search module 140 (via the device communication module 135), from a mobile device 110 operated by a user. The query is parsed 303 by the parser 201 to determine a sequence of query tokens. For example if a query "delhi hindu dr" is received, it would be parsed into the tokens "delhi," "hindu," and "dr." In some embodiments, the mobile search module 140 receives search queries via SMS. In other embodiments, the mobile search module 140 receives search queries via other communication means, such as TCP/IP, enhanced messaging service (EMS), multimedia messaging service (MMS), and the like.

The query tokens are normalized 305. In some embodiments, the token normalization process removes the inflection from words to their stem or root form. For example the normalization process 305 may transform the token "seeking" into the token "seek." The token normalization process may also replace abbreviated forms of words to the actual word. For example, the normalization process may transform the token "dr" into the token "doctor." In the above example, the tokens "delhi," "hindu," and "dr" will be normalized into the tokens "delhi," "hindu," and "doctor." In some embodiments, the tokens are analyzed to determine which token classification or attribute each of them belongs to. For example, "delhi" corresponds to the location token classification, "hindu" corresponds to the religion token classification, and "doctor" corresponds to the profession token classification.

In one embodiment, the normalization of a token is based on a predetermined set of token classifications. For example, for matrimonial classified ads, the normalization process may be based on a set of token classifications that include religion, caste, age, location, income, education level, occupation, etc.

Query response candidates are selected 307 from the content index 207 based on the query tokens. In some embodiments, documents that contain at least one token from the query tokens are selected as query response candidates. In other embodiments, documents that contain at least a threshold number of tokens from the query tokens (e.g., 50% of the query tokens) are selected as query response candidates. For instance, in the above example, the following query response candidates may be selected t1=[delhi hindu engineer]
t2=[mumbai hindu doctor]
t3=[delhi christian doctor]

In the example above, all query response candidates have at least two tokens in common with the received search query.

Query response candidates are filtered 309. In one embodiment, a predefined set of filters is applied depending on the domain of the search query. For example, if the search query is related to matrimonial classified, then a filter based on religion/case, culture, marital status, horoscope, and/or age can be applied to the selected query response candidates. For instance, query response candidate t3 may be filtered out because the token for religion is different than the token for religion in the search query. This would leave only t1 and t2 as query response candidates.

A relevance score for each of the query response candidates is generated 311 and a query response is selected 313 from the query response candidates based on their generated relevance score. A detailed description of a method for calculating the relevance score of query response candidates is included in conjunction with FIG. 4.

In some embodiments, the query response candidate with the highest relevance score is selected 313 from the query response candidates. In other embodiment, a predetermined number of query responses (e.g., three) with the highest relevance score are selected 313. In yet other embodiments, the user sending the search query may specify the number of query responses are selected 313.

The selected query response candidate(s) is sent 315 to the user's mobile device 110 through the device communication module 135. In one embodiment, the query response is sent as an SMS (text). In other embodiments, the query response is sent through other means such as through a mobile application installed in the user's mobile device 110. In one embodiment, a notification is also sent to the users that posted the selected query response candidates.

Figure 4:
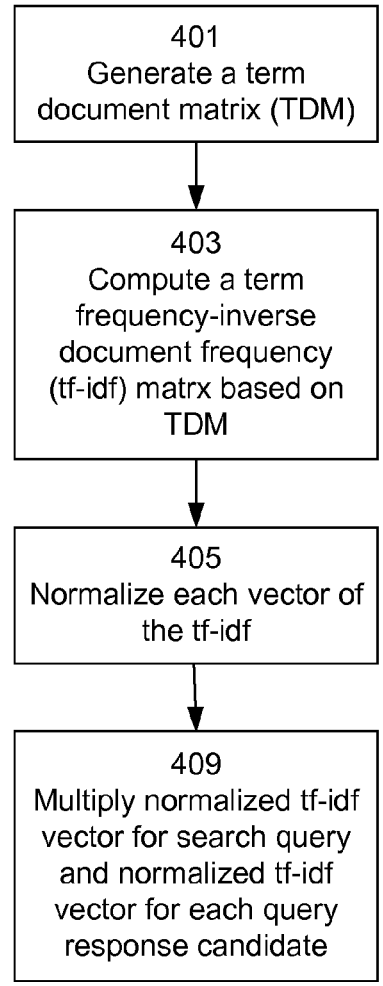
FIG. 4 is a flow chart illustrating an example process for generating a query response, according to one embodiment.

FIG. 4 illustrates a high level flowchart of a process for generating a relevance score for a plurality of query response candidates. A term-document matrix (TDM) is generated 401. A TDM describes the frequency of terms in each of the documents. For the example, the following TDM can be generated for the search query and query response candidates described above

|        | s | t1 | t2 |
|--------|---|----|----|
| delhi  | 1 | 1  | 0  |
| hindu  | 1 | 1  | 1  |
| doctor | 1 | 0  | 1  |

In this exemplary TDM, each columns of the matrix or vector represent different documents (search query s, and query response candidates t1 and t2). Rows represent different terms (e.g., delhi, hindu, doctor). The values in the TDM represent how many times each term appears in each of the documents. For instance the term "delhi" appears once in s and once in t1, the term "hindu" appears once in each of the documents, and the term "doctor" appears once in s and once in t2.

A term frequency-inverse document frequency (tf-idf) matrix is calculated 403 based on the generated TDM. A tf-idf matrix quantifies how important each token is to each query response candidate. In one embodiment, the tf-idf of each token with respect to each query response candidate is calculated. The td-idf of each term can be calculated as the term frequency of a token (t) in a query response candidate (d) multiplied by the inverse document frequency of the token (t) in all query response candidates (D).

$$td\text{-}idf = tf(t,d) \times idf(t,D) \qquad (1)$$

The term frequency of a token (t) in a document (d) can be calculated as number of times or frequency the token (t) appears in the query response candidate (d) divided by the frequency of the token (w) that appears the most number of times in the query response candidate (d)

$$tf(t,d) = \frac{f(t,d)}{\max\{f(w,d): w \in d\}} \qquad (2)$$

The inverse document frequency of a token (t) in a collection of documents (D) can be calculated as the logarithm of the total number of documents (|D|) in the collection of documents (D) divided by the number of documents that contains the token (t).

$$idf(t,D) = \log\frac{|D|}{|\{d \in D: t \in d\}|} \qquad (3)$$

In some embodiments the logarithmic operation is a base 10 logarithm. In other embodiments, the logarithmic operation is a natural logarithm (ln).

For example, the following tf-idf may be computed from the TDM shown above

|        | s       | t1      | t2      |
|--------|---------|---------|---------|
| delhi  | 0.40547 | 0.40547 | 0       |
| hindu  | 0       | 0       | 0       |
| doctor | 0.40547 | 0       | 0.40547 |

Since the token "hindu" is present in the search query and all query response candidates, the inverse domain frequency of the token "hindu" in every vector is zero (i.e., idf("hindu")=ln(3/3)=0). Also, since the token "delhi" is not present in t2, and the token "doctor" is not present in t1, their respective term frequency is also zero (i.e., tf("delhi", t2)=0 and tf("doctor", t1)=0). Finally, the token "delhi" is present in both s and t1 (i.e., tf("delhi", s)=tf("delhi", t1)=1; idf("delhi", s)=idf("delhi",t1)=ln(3/2)=0.40547), and the token "doctor" is present in both s and t2 (i.e., tf("doctor", s)=tf("doctor", t2)=1; idf("doctor", s)=idf("doctor", t2)=ln(3/2)=0.40547).

The tf-idf matrix is normalized 405. In some embodiments, each column or vector in the tf-idf is normalized independently. In one embodiment, to normalize a vector, each term of the vector is divided by the length or norm of the vector. For example, the tf-idf matrix shown above may be normalized to the matrix

|        | s       | t1 | t2 |
|--------|---------|----|----|
| delhi  | 0.70711 | 1  | 0  |
| hindu  | 0       | 0  | 0  |
| doctor | 0.70711 | 0  | 1  |

The relevance score for each query response candidate is generated by multiplying the normalized tf-idf vector of the search query with the normalized tf-idf vector of each of the query response candidates. For example, the following relevance scores can be computed for query response candidates t1 and t2.

|    | s       |
|----|---------|
| s  | 1       |
| t1 | 0.70711 |
| t2 | 0.70711 |

In some embodiments, each token may be assigned a different weight. For example, tokens associated with profession (e.g., doctor) may be assigned a weight of 10, and all other token may be assigned a weight of 1. In one embodiment, the weights for each of the tokens are a predefined number. In another embodiment, the user sending the search query may specify the weights of each of the tokens in the search query. In yet another embodiment, a user may specify in their user profile the weights to be used for each of the token categories. Other The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method for providing access to classified ads via a mobile device, the method comprising a computer system performing the steps of:
    receiving a query from a mobile device, the query comprising one or more query tokens;
    normalizing the query tokens;
    based on the query tokens, selecting query response candidates from a content index for the classified ads;
    generating a relevance score for each query response candidate;
    selecting a classified ad based on the relevance scores for the query response candidates; and
    sending the selected classified ad to the mobile device;
    generating a term document matrix (TDM) based on the normalized query tokens and on tokens for the query response candidates;
    computing a term frequency-inverse document frequency (tf-idf) matrix based on the TDM, the tf-idf matrix co a vector for each query response candidate;
    normalizing the vectors of the tf-idf matrix; and
    computing a similarity score for each query response candidate based on the corresponding normalized vector of the tf-idf matrix.

2. The method of claim 1, wherein the query is received via short message service (SMS).

3. The method of claim 1 wherein the classified ads include classified want ads for buying and/or selling physical objects.

4. The method of claim 1 wherein the classified ads include classified want ads for real estate rentals.

5. The method of claim 1 wherein the classified ads include classified want ads for persons seeking other persons.

6. The method of claim 1 wherein the classified ads include classified matrimonial ads for persons seeking mates.

7. The method of claim 6, wherein the step of normalizing the query tokens is based on a predetermined set of token classifications that includes at least a majority of: religion, caste, age, location, income, education level, and occupation.

8. The method of claim 1 wherein the classified ads include a east two different categories of classified ads.

9. The method of claim 7 wherein the steps of normalizing query tokens, selecting query response candidates, generating relevance scores and selecting a query response all depend on the category of the classified ad.

10. The method of claim 1 wherein the classified ads include newspaper classified ads.

11. The method of claim 1 further comprising:
    receiving a request to post a new classified ad from a poster's mobile device; and
    posting the classified ad in response to the request.

12. The method of claim 11, wherein the request is received via short message service (SMS).

13. The method of claim 1 further comprising:
    receiving a request to manage a poster's classified ad from the poster's mobile device; and
    managing the classified ad according to the request.

14. The method of claim 1 further comprising:
    sending notification of the received query to a poster of the selected classified ad.

15. The method of claim 1, wherein the step of selecting query response candidates from a content index is based on the query response candidates having at least a certain number of tokens in common with the query tokens.

16. The method of claim 1, wherein the step of normalizing the query tokens is based on a predetermined set of token classifications.

17. The method of claim 16, wherein the step of selecting query response candidates from a content index is based on filtering query response candidates according to the token classifications and the query tokens.

18. The method of claim 1 wherein computing a similarity score for each query response candidate comprises:
    multiplying (a) a normalized vector of the tf-idf matrix associated with the query with (b) the normalized vector of the tf-idf matrix associated with that query response candidate.

19. A classified ads server system for providing access to classified ads via a mobile device, the server system configured for:
    receiving a query from a mobile device, the query comprising one or more query tokens;
    normalizing the query tokens;
    based on the query tokens, selecting query response candidates from a content index for the classified ads;
    generating a relevance score for each query response candidate;
    selecting a classified ad based on the relevance scores for the query response candidates; and
    sending the selected classified ad to the mobile device;
    generating a term document matrix (TDM) based on the normalized query tokens and on tokens for the query response candidates;
    computing a term frequency-inverse document frequency (tf-idf) matrix based on the TDM, the tf-idf matrix comprising a vector for each query response candidate;
    normalizing the vectors of the tf-idf matrix; and
    computing a similarity score for each query response candidate based on the corresponding normalized vector of the tf-idf matrix.

20. A non-transitory computer readable medium configured to
    store instructions executable by a computer processor, the instructions for:
    receiving a query from a mobile device, the query comprising one or more query tokens;
    normalizing the query tokens;
    based on the query tokens, selecting query response candidates from a content index for the classified ads;
    generating a relevance score for each query response candidate;
    selecting a classified ad based on the relevance scores for the query response candidates; and
    sending the selected classified ad to the mobile device;
    generating a term document matrix (TDM) based on the normalized query tokens and on tokens for the query response candidates;

computing a term frequency-inverse document frequency (tf-idf) matrix based on the TDM, the tf-idf matrix comprising a vector for each query response candidate;
normalizing the vectors of the tf-idf matrix; and
computing a similarity score for each response candidate based on the corresponding normalized vector of the tf-idf matrix.

* * * * *